United States Patent [19]
Murakami et al.

[11] Patent Number: 5,025,482
[45] Date of Patent: Jun. 18, 1991

[54] IMAGE TRANSFORMATION CODING DEVICE WITH ADAPTIVE QUANTIZATION CHARACTERISTIC SELECTION

[75] Inventors: Tokumichi Murakami; Kohtaro Asai; Kazuhiro Matsuzaki, all of Kanagawa, Japan

[73] Assignee: Mitsubishi Denki Kabushiki Kaisha, Tokyo, Japan

[21] Appl. No.: 525,588

[22] Filed: May 21, 1990

[30] Foreign Application Priority Data

May 24, 1989 [JP] Japan ................................. 1-128867

[51] Int. Cl.⁵ .............................................. G06K 9/36
[52] U.S. Cl. ........................................ 382/56; 382/50
[58] Field of Search ............................... 382/56, 50–53; 358/105

[56] References Cited

U.S. PATENT DOCUMENTS

| | | | |
|---|---|---|---|
| 4,339,774 | 7/1982 | Temple | 382/50 |
| 4,516,263 | 5/1985 | Dew et al. | 382/50 |
| 4,520,280 | 5/1985 | Yoshikawa et al. | 382/50 |
| 4,862,267 | 8/1989 | Gillard et al. | 358/105 |
| 4,875,094 | 10/1989 | Haghiri et al. | 358/105 |
| 4,924,308 | 5/1990 | Feuchtwagner | 358/105 |
| 4,949,391 | 8/1990 | Faulkerson et al. | 382/56 |

OTHER PUBLICATIONS

W. H. Chen & W. K. Pratt "Scene Adaptive Coder" IEEE Trans., COM-32, 3, pp. 225-232 (Mar., 1984).
R. Plompen, Y. Hatori, W. Geuen, J. Guichard, M. Guglielmo, H. Brusewitz, "Motion Video C in CCITT SG XV—The Video Source Coding", in Proc. Globecom 88, 31.2, pp. 998-1004 (1984).

Primary Examiner—Stephen Brinich
Attorney, Agent, or Firm—Rothwell, Figg, Ernst & Kurz

[57] ABSTRACT

A transformation coding device which applies high by efficient coding to a digital image signal, and in which a plurality of quantization characteristics are prepared and one quantization characteristic is adaptively selected in accordance with a predicted distortion for an input signal and a sequence of transformation coefficients, thereby allowing the quantization to be performed in accordance with statistical properties of an input signal to be implemented, and at the same time, allowing a signal to be efficiently compressed.

4 Claims, 3 Drawing Sheets

FIG. 3

| SEQUENCE OF TRANSFORMATION COEFFICIENT | MOVEMENT COMPENSATING PREDICTED DISTORTION | QUANTIZED STEP-SIZE |
|---|---|---|
| LOW RANGE | SMALL | LARGE |
| LOW RANGE | INTERMEDIATE | SMALL |
| LOW RANGE | LARGE | SMALL |
| INTERMEDIATE RANGE | SMALL | LARGE |
| INTERMEDIATE RANGE | INTERMEDIATE | SMALL |
| INTERMEDIATE RANGE | LARGE | INTERMEDIATE |
| HIGH RANGE | SMALL | LARGE |
| HIGH RANGE | INTERMEDIATE | SMALL |
| HIGH RANGE | LARGE | LARGE |

IMAGE TRANSFORMATION CODING DEVICE WITH ADAPTIVE QUANTIZATION CHARACTERISTIC SELECTION

BACKGROUND OF THE INVENTION

1. Field of the Invention

This invention relates to a transformation coding device which applies a highly efficient coding to a digital image signal.

2. Description of the Prior Art

FIG. 1 is block connection diagram showing a a conventional transformation coding device described in, for example, the paper entitled "A proposal of a coding control method in a MC-DCT coding system" by Kato et al., at the National Conference on Information and System Dept. (1-204) of the Institute of Electronics, Information and Communication Engineers, 1987. In FIG. 1, reference numeral 11 is a subtractor which performs subtraction between an input signal 101 as a digital image input signal series and a prediction signal 102 between movement compensating frames, 1 is an orthogonal transformation unit which performs orthogonal transformation for a difference signal 103 between frames, 2b is a quantization unit which applies a threshold processing to a transformation coefficient 104 obtained by the orthogonal transformation in accordance with an amount of data storage in a buffer 112 and then outputs a quantization index 106, 3b is a quantization decoding unit which applies a quantization decoding to the quantization index 106 and outputs a quantization transformation coefficient 107, 4 is an inverse orthogonal transformation unit which applies inverse orthogonal transformation to the quantization transformation coefficient 107 and produces a difference signal between decoding frames 108, 12 is an adder, 5 is a frame memory which produces the prediction signal 102 between movement compensating frames, 6 is a movement compensating unit, 7 is a variable length coding unit, 111 is coded data, 8 is a buffer for transmission, and 113 is transmitted data.

Next, the operation will be described. The difference between the input signal 101 and the prediction signal 102 between movement compensating frames is obtained using the subtractor 11 to produce the difference signal 103 between frames from which redundant components are removed. In the orthogonal transformation unit 1, the difference signal 103 between frames is transformed into a spatial frequency region using orthogonal transformation to produce the transformation coefficient 104. In the quantization unit 2b the transformation coefficient 104 is subjected to the following threshold processing based on an amount of buffer storage data described later.

An amount of buffer storage: Large →Threshold value Th: Large

An amount of buffer storage: Small →Threshold value Th: Small $C_i \geq Th \rightarrow C_i$: Insignificant coefficient
$C_i > Th \rightarrow C_i$: Significant coefficient
Where $C_i$: transformation coefficient.

The transformation coefficient 104 which is a significant coefficient as the result of the threshold processing is quantized in the quantization unit 2b and outputted as a corresponding index 106. On the other hand, the transformation coefficient 104 which is an insignificant coefficient is output as the quantization index 106 corresponding to zero. The quantization index 106 is subjected to a variable length coding together with a movement vector 105 described later and outputted as a coded data 111 from the variable length coding unit 7. On the other hand, the quantization index 106 is simultaneously transformed into the transformation coefficient 107 as the result of quantization decoding in the quantization decoding unit 3b. In the inverse orthogonal transformation unit 4, the transformation coefficient 107 is transformed into the difference signal 108 between decoding frames. Subsequently, in the adder 12, the difference signal 108 between decoding frames and the above-mentioned prediction signal 102 between movement compensating frames are added to produce a decoded signal 109. The decoded signal 109 is temporarily stored in the frame memory 5 to produce the prediction signal 102 between movement compensating frames as the result of the movement compensation. Also, in the movement compensating unit 6, after the input signal 101 is divided into a plurality of blocks, displacement between the most similar portions, defined by the sum of the absolute value of the difference between two blocks or the sum of squares of the difference etc. are calculated using a preceding frame demodulated signal 110 located at the spatially same position or in the vicinity for each block, portions which provide the minimum displacement are detected from image signal 110 of the preceding frame, and the minimum amount of spatial displacement is outputted as the movement vector 105. The above-mentioned coded data 111 is temporarily stored in the buffer 8 for transmission, outputted as transmitted data 113 with a fixed bit rate, and at the same time, an amount of buffer data storage 112 is outputted as a feedback signal in order to prevent buffer overflow. Since the conventional transformation coding device is constituted as described above and a selection of quantization characteristics is performed by using only an amount of buffer data storage for transmission, there is a defect that it is difficult to carry out adaptive quantization in accordance with statistical properties of an input signal such as power and frequency characteristics, and it is impossible to compress a signal efficiently.

SUMMARY OF THE INVENTION

This invention is devised in order to solve such problems, and it is an object of this invention to obtain a transformation coding device capable of quantizing a signal efficiently in accordance with statistical properties of the input signal.

In order to achieve the above-mentioned objectives, a transformation coding device related to this invention prepares a plurality of quantization characteristics, and selects one quantization characteristic adaptively in accordance with a predicted distortion for an input signal and a sequence of transformation coefficients.

In other words, the conversion coding device in this invention selects one quantization characteristic from among a plurality of quantization characteristics prepared in accordance with a predicted distortion for an input signal and a sequence of transformation coefficients and functions so as to quantize the transformation coefficient.

The above-mentioned and other objects and features of this invention will become clearer from the following detailed description in conjunction with the accompanying diagrams. The drawings are provided for purposes of explanation only and do not limit the scope of this invention.

BRIEF DESCRIPTION OF THE DRAWINGS

FIG. 3 is an explanatory diagram showing the relationship among the transformation coding sequence, the magnitude of a movement compensating predicted distortions, and the quantization characteristic employed in the case where three kinds of quantization characteristics having different quantization step sizes in this invention are prepared.

DETAILED DESCRIPTION OF THE PREFERRED EMBODIMENT

Figure 1:
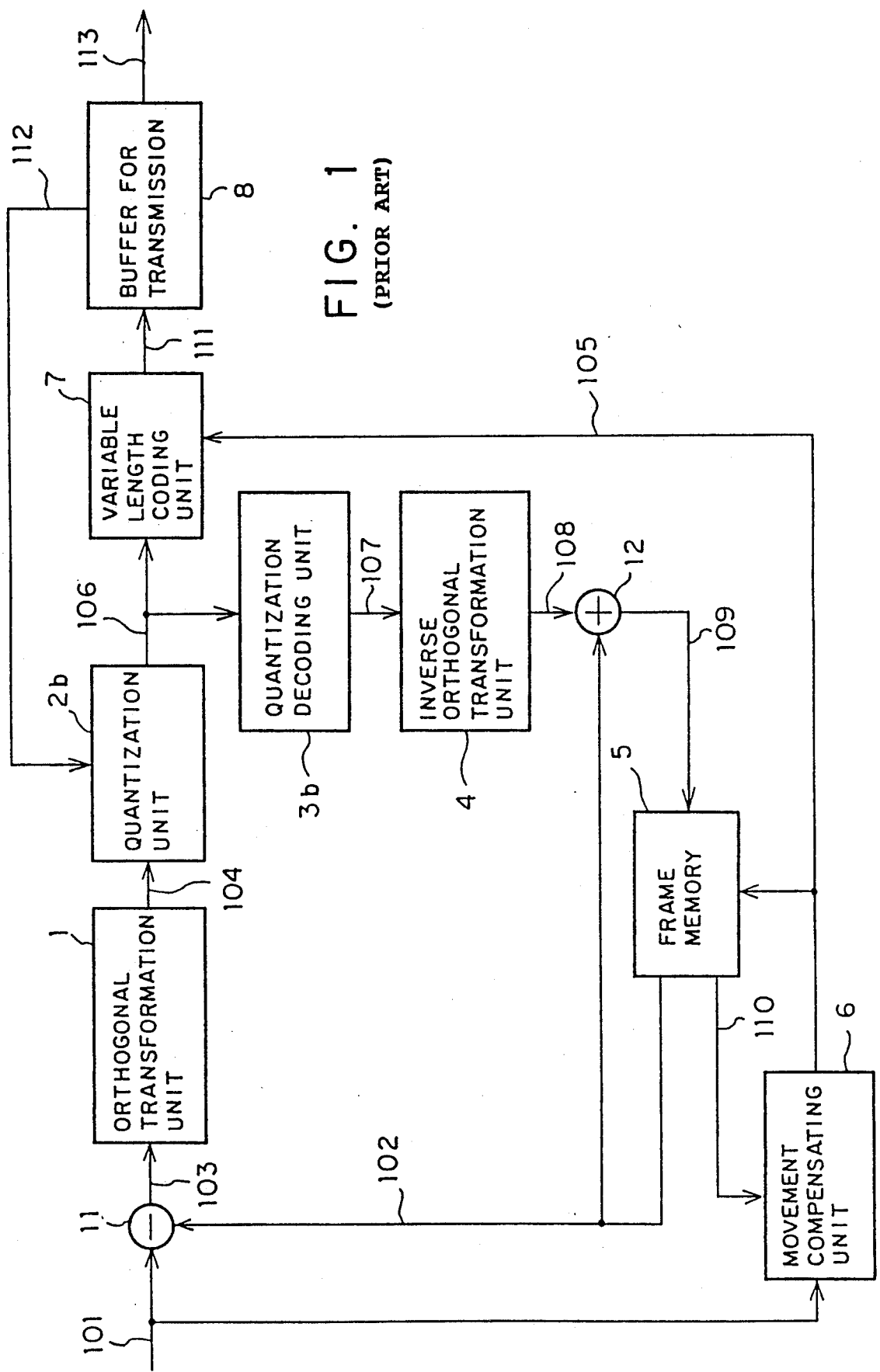
FIG. 1 is a block connection diagram showing a conventional transformation coding device.
Figure 2:
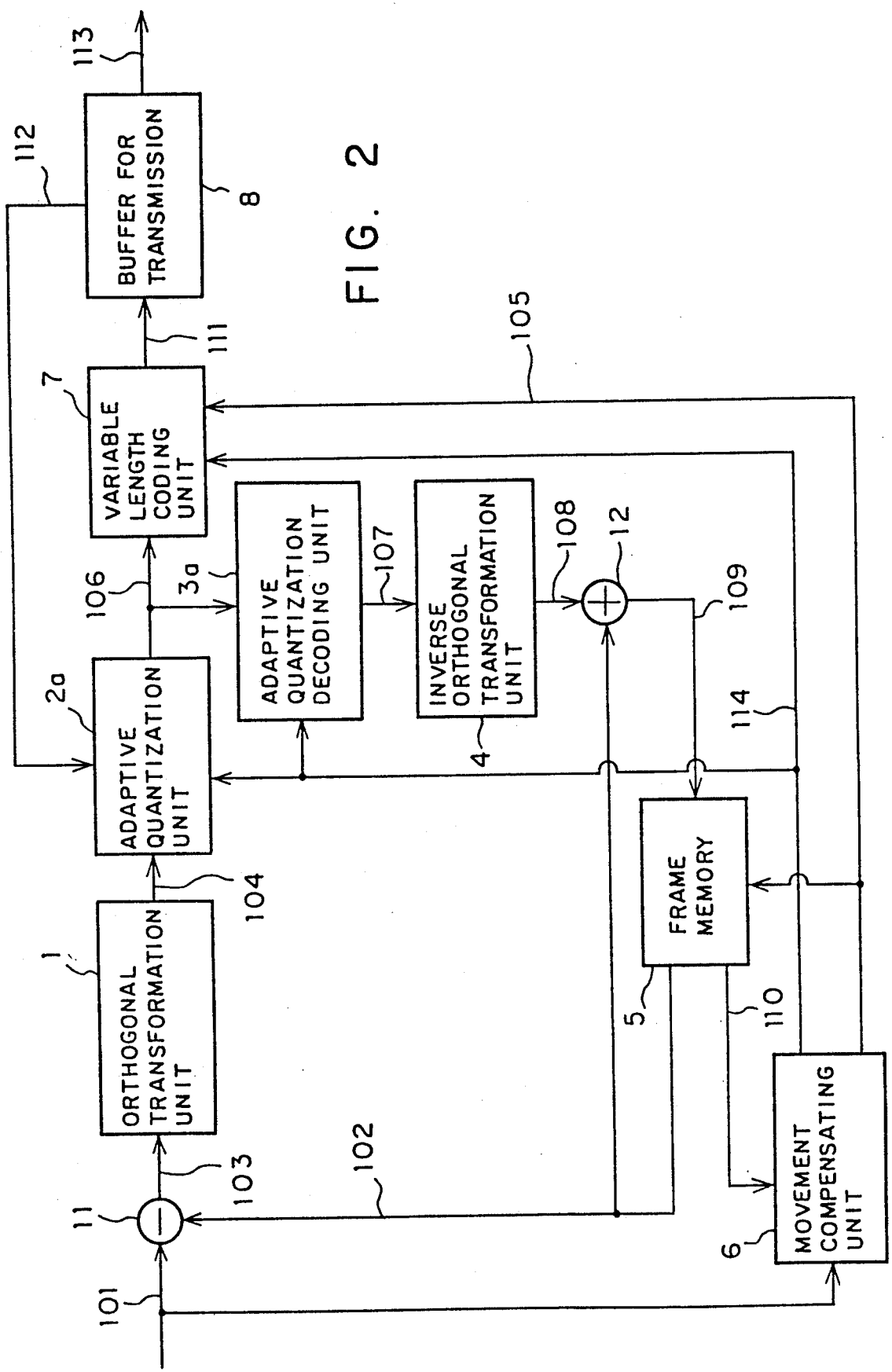
FIG. 2 is a block diagram showing the constitution of a transformation coding device according to an embodiment of this invention.

Hereinafter, an embodiment according to this invention will be described with reference to the drawings. In FIG. 2, reference numerals 2a and 3a are an adaptive quantization unit, respectively and an adaptive quantization decoding unit both of which select an appropriate one from among a plurality of quantization characteristics and use it in accordance with spatial frequencies corresponding to a distortion signal 114 at the time of a movement compensating prediction for input signal 101 and calculation of a sequence of transformation coefficients, respectively. Incidentally, the same blocks and signals as those shown in FIG. 1 are identified by the same numerals, and the duplicated description is omitted.

Next, the operation will be described. In general, it is difficult to visually recognize distortions which occur on portions changed with time rapidly as a movement region, and which have a high spatial frequency. Further, when a portion of large movement compensating distortion is frequent the movement region and the dynamic-range for signals is broad. In an allocation of coding words of the quantization index a short coding word is allocated to the quantization index corresponding to a quantization central value in the vicinity of zero.

Accordingly, in the case where a movement compensating predicted distortion is large and a sequence of transformation coefficients is high, the quantization is performed in a large step-size of quantization so that a highly efficient coding is obtained by holding the subjective image quality deterioration small. Also, in a portion of small predicted distortion, even if the quantization output is rendered zero, there are not many problems for visual sensation and highly efficient coding is obtained, therefore a large quantization step size is selected.

FIG. 3 shows a relationship among the sequence of transformation coefficients, the magnitude of a movement compensating predicted distortion, and the quantization characteristic employed in the case where three kinds of quantization characteristics are developed.

Further, a classification for the sequence of transformation coefficients the predicted distortion is performed by threshold processing through setting the threshold value. A transformation coefficient 104 and a movement compensating predicted distortion signal 114 at the time of movement compensation both obtained by a similar to the processing convention processing are inputted into the adaptive quantization unit 2a. In the adaptive quantization unit 2a, as shown in FIG. 3, an appropriate quantization characteristic is selected in accordance with a sequence of the transformation coefficient 104 and the magnitude of the movements compensating predicted distortion signal 114 and the unit 20 applies quantization to the transformation coefficient 104 which was significant as the result of threshold processing based on an amount of buffer data storage 112. On the other hand, in the adaptive quantization decoding unit 3a, like the adaptive quantization unit 2a, an appropriate quantization characteristic is selected, in accordance with a sequence of the quantization index 106 and the magnitude of the movement compensating predicted distortion signal 114, thereby performing quantization decoding. In order to make the quantization characteristic on the coding side coincide with that on the decoding side, the movement compensating predicted distortion signal 114 is subjected to variable length coding in the variable length coding unit 7, and then sent to the decoding side. The other portions are subjected to the same processing as the conventional one.

Incidentally, in the above-mentioned embodiment, there is shown the case where a quantization characteristic is changed over in accordance with a spatial frequency component corresponding to a sequence of the transformation coefficient 104 and the magnitude of a movement compensating predicted distortion signal 114. But, in the case where the movement compensating predicted distortion signal 114 is smaller than an arbitrarily determined threshold value, if control is effected so as to block all sequences of the transformation coefficient. There is an effect that noises in the time direction are reduced.

As described above, according to this invention, since a plurality of quantization characteristics are prepared, and these quantization characteristics are used properly in accordance with the sequence of the transformation coefficient and the magnitude of the distortion at the time of movement compensating prediction, there can be obtained such a transformation coding device that the quantization in accordance with statistical properties of an input signal is implemented, and at the same time, a signal can be compressed efficiently.

What is claimed is:

1. A transformation coding device comprising:
   a movement compensating unit which divides a digital image input signal series into a plurality of blocks, and thereafter compares respective blocks with corresponding preceding frame image signals located at the same spatial positions or in the vicinity of said position, detects the most similar portions of said blocks from among said preceding frame image signals, and outputs a spatial amount of displacement between said blocks and the similar portions of said preceding frame image signals as a motion vector;
   a subtractor which subtracts a prediction signal between movement compensating frames produced in accordance with said motion vector from said digital image input signal and a generates difference signal corresponding to the result of said subtraction;
   an orthogonal transformation unit which applies orthogonal transformation to said difference signal and outputs a transformation coefficient;
   an adaptive quantization unit which selects one quantization characteristic from among a plurality of predetermined quantization characteristics in accordance with both the degree of similarity of the prediction signal between movement compensating frames for said block digital image signal series and a sequence of said transformation coefficient and applies quantization to said transformation coefficient according to the selected quantization characteristic;

an adaptive quantization decoding unit which selects one quantization characteristic from among a plurality of predetermined quantization characteristics corresponding to both the degree of similarity of the prediction signal between movement compensating frames and the sequence of said transformation coefficient, and applies quantization decoding to the quantized transformation coefficient from said adaptive quantization unit;

an inverse orthogonal transformation unit which applies inverse orthogonal transformation to the quantization decoded transformation coefficient to produce a difference signal between decoded frames;

an adder which adds said difference signal between decoded frames and said prediction signal between movement compensating frames to produce a decoded image signal;

a frame memory which stores said decoded image signal temporarily to output said prediction signal between movement compensating frames in accordance with said motion vector;

a variable length coding unit which applies variable length coding to said quantized transformation coefficient and outputs the result as coded data; and a transmitting buffer which stores said coded data temporarily, outputs them with a fixed bit rate, and at the same time, outputs an amount of buffer data storage as a feedback signal to said adaptive quantization unit in order to prevent buffer overflow.

2. The transformation coding device according to claim 1, wherein, in said adaptive quantization unit, there is further produced a threshold value based on said feedback signal, threshold processing is applied to a transformation coefficient from said orthogonal transformation unit, and thereafter only a transformation coefficient above said threshold is quantized.

3. The transformation coding device according to claim 1 or claim 2, wherein a prediction signal between movement compensating frames which is output from said movement compensating unit is inputted into said variable length coding unit and applied with variable length coding, and thereafter inputted into said adaptive quantization decoding unit to make the quantization characteristic on the coding side coincide with that on the decoding side.

4. The transformation coding device according to claim 2, wherein, in said adaptive quantization unit, all of sequences of said transformation coefficients are blocked in the case where the degree of similarity of said prediction signal between movement compensating frames is smaller than an arbitrarily fixed threshold value.

* * * * *

UNITED STATES PATENT AND TRADEMARK OFFICE
CERTIFICATE OF CORRECTION

PATENT NO. : 5,025,482
DATED : June 18, 1991
INVENTOR(S) : Tokumichi Murakami et al.

It is certified that error appears in the above-identified patent and that said Letters Patent is hereby corrected as shown below:

Cover page, in the Abstract, first line, "high by" should be --highly--.

Column 1, line 12, after "is" insert --a--; and after "showing" delete "a";
    line 59, "$\geq$" should be -- $\leq$ --;
    line 65, after "corresponding" insert --quantization--.

Column 3, line 13, "tortions" should be --tortion--;
    line 23, after "unit" delete ", respectively";
    line 24, after "unit" insert --, respectively--;
    line 62, after "coefficients" insert --and--;
    line 67, after "by" delete "a similar to the";
    line 67, after "processing" insert --similar to the--;
    line 67, "convention" should be --conventional--.

Column 4, line 4, "movements" should be --movement--;
    line 5, "20" should be --2a--;
    line 33, after "cient" the period "." should be a comma --,--;
        and "There" should be --there--;

UNITED STATES PATENT AND TRADEMARK OFFICE
CERTIFICATE OF CORRECTION

PATENT NO. : 5,025,482

DATED : June 18, 1991

Page 2 of 2

INVENTOR(S) : Tokumichi Murakami et al.

It is certified that error appears in the above-identified patent and that said Letters Patent is hereby corrected as shown below:

```
Column 4, line 52, "position" should be --positions--;
         line 62, after "and" delete "a" and after "generates" insert
            --a--.
```

Signed and Sealed this

Twenty-ninth Day of December, 1992

*Attest:*

DOUGLAS B. COMER

*Attesting Officer*          *Acting Commissioner of Patents and Trademarks*